US012175588B2

(12) United States Patent
Hansson Soederlund et al.

(10) Patent No.: US 12,175,588 B2
(45) Date of Patent: Dec. 24, 2024

(54) TECHNIQUES FOR AVOIDING SELF-INTERSECTIONS WHEN RENDERING SIGNED DISTANCE FUNCTIONS

(71) Applicant: NVIDIA CORPORATION, Santa Clara, CA (US)

(72) Inventors: Herman Hansson Soederlund, Karlskrona (SE); Tomas Akenine-Moller, Lund (SE)

(73) Assignee: NVIDIA CORPORATION, Santa Clara, CA (US)

( * ) Notice: Subject to any disclaimer, the term of this patent is extended or adjusted under 35 U.S.C. 154(b) by 332 days.

(21) Appl. No.: 17/674,785

(22) Filed: Feb. 17, 2022

(65) Prior Publication Data
US 2023/0316628 A1 Oct. 5, 2023

(51) Int. Cl.
*G06T 15/06* (2011.01)
*G06T 15/00* (2011.01)
*G06T 15/10* (2011.01)

(52) U.S. Cl.
CPC ............ *G06T 15/06* (2013.01); *G06T 15/005* (2013.01); *G06T 15/10* (2013.01)

(58) Field of Classification Search
CPC ........ G06T 15/06; G06T 15/005; G06T 15/10
See application file for complete search history.

(56) References Cited

U.S. PATENT DOCUMENTS

| 5,442,733 | A | * | 8/1995 | Kaufman | G06T 15/06 345/419 |
| 9,754,413 | B1 | * | 9/2017 | Gray | H04N 23/698 |
| 2010/0194751 | A1 | * | 8/2010 | Wald | G06T 15/06 345/426 |
| 2012/0069023 | A1 | * | 3/2012 | Hur | G06T 15/06 345/426 |
| 2018/0012370 | A1 | * | 1/2018 | Aghamohammadi | G06F 18/251 |
| 2019/0200041 | A1 | * | 6/2019 | Kubota | H04N 13/111 |
| 2022/0067240 | A1 | * | 3/2022 | Eom | G06F 30/13 |
| 2022/0196840 | A1 | * | 6/2022 | Hilliges | G06T 17/00 |
| 2022/0254092 | A1 | * | 8/2022 | Barnard | G06T 15/06 |

OTHER PUBLICATIONS

Aaltonen, Sebastian, "GPU-based Clay Simulation and Ray Tracing Tech in Claybook", In Game Developers Conference, 2018, 70 pages.
Evans, Alex, "Learning from Failure: A Survey of Promising, Unconventional and Mostly Abandoned Renderers for Dreams PS4', a Geometrically Dense, Painterly UGC Game", In Advances in Real-Time Rendering in Games, SIGGRAPH, 2015, 145 pages.
(Continued)

*Primary Examiner* — Phi Hoang
(74) *Attorney, Agent, or Firm* — Artegis Law Group, LLP

(57) ABSTRACT

One embodiment of a method for rendering one or more graphics images includes tracing one or more rays through a graphics scene; storing one or more hit points based on one or more coordinate frames associated with one or more voxels of a grid, where the one or more rays intersect one or more surfaces of geometry in the one or more voxels; and rendering one or more graphics images based on the one or more hit points that are stored.

22 Claims, 11 Drawing Sheets

(56) References Cited

OTHER PUBLICATIONS

Hamann et al., "On Approximating Contours of the Piecewise Trilinear Interpolant Using Triangular Rational-Quadratic Bezier Patches", IEEE Transactions on Visualization and Computer Graphics, vol. 3, No. 3, 1997, pp. 215-227.
Hart, John C., "Sphere Tracing: A Geometric Method for the Antialiased Ray Tracing of Implicit Surfaces", The Visual Computer, vol. 12, 1996, pp. 527-545.
Wächter et al., "A Fast and Robust Method for Avoiding Self-Intersection", In Ray Tracing Gems, https://doi.org/10.1007/978-1-4842-4427-2_6, Eds. Apress, Chapter 6, 2019, pp. 77-85.
Parker et al., "Interactive Ray Tracing for Isosurface Rendering", Proceedings of the IEEE Visualization, 1998, 6 pages.

* cited by examiner

TECHNIQUES FOR AVOIDING SELF-INTERSECTIONS WHEN RENDERING SIGNED DISTANCE FUNCTIONS

BACKGROUND

Technical Field

Embodiments of the present disclosure relate generally to computer science and computer graphics and, more specifically, to techniques for avoiding self-intersections when rendering signed distance functions.

Description of the Related Art

In three-dimensional (3D) computer graphics, signed distance functions (SDFs) are commonly used to represent the virtual 3D geometry of objects. An SDF specifies the distances from one or more points in space to the surfaces of one or more objects within a 3D graphics scene. From a given point in space, a positive distance indicates that the point is outside an object, and a negative distance indicates that the point is inside an object.

Ray tracing is a popular technique for rendering 3D graphics images. Ray tracing techniques trace the paths of light rays and simulate the effects of those light rays interacting with virtual objects within a virtual scene. When a ray is traced into a virtual scene in which 3D geometry is represented by an SDF, a hit point at which the ray intersects a surface of the 3D geometry can be computed and used to determine a pixel color. Conventional rendering techniques typically store the hit point as a distance from the origin of the ray. When a continuation ray needs to be traced from the hit point, the location of the hit point can be reconstructed based on the origin of the ray, the stored distance from the origin, and a known direction of the ray. Examples of continuation rays include reflection and refraction rays that simulate reflection and refraction of light from the surface of 3D geometry, respectively, and shadow rays that are used to determine whether a hit point is located within a shadow.

One drawback of the above approach for storing a hit point is that, due to limits associated with how accurately the distance from the origin of the ray is stored, a reconstructed hit point can end up being located within the 3D geometry in a virtual scene, rather than on a surface of the 3D geometry. In such situations, when a continuation ray is traced from the reconstructed hit point located within the 3D geometry, the continuation ray can end up intersecting the surface of the 3D geometry a second time. These types of intersections are referred to herein as "self-intersections." When rendering an image, self-intersections can cause artifacts in the rendered image, such as black pixels where there should be colored pixels instead.

One conventional technique for reducing self-intersections involves adding a small offset to a reconstructed hit point along a direction that is normal to the surface of the 3D geometry. A continuation ray can then be traced beginning from this offset hit point. As a general matter, however, offset hit points tend to be above the surfaces of the relevant 3D geometries, which also can cause related artifacts in rendered images. For example, a rendered image can include incorrect shadows when shadow rays are not traced from the surfaces of 3D geometry to light sources. In addition, tracing a continuation ray from an "incorrect" offset hit point can still produce a self-intersection when the offset hit point falls within the surface of some other 3D geometry in a virtual scene. As discussed above, such self-intersections also produce artifacts in rendered images.

As the foregoing illustrates, what is needed in the art are more effective techniques for avoiding self-intersections when rendering graphics images.

SUMMARY

One embodiment of the present disclosure sets forth a computer-implemented method for rendering one or more graphics images. The method includes tracing one or more rays through a graphics scene. The method further includes storing one or more hit points based on one or more coordinate frames associated with one or more voxels of a grid, where the one or more rays intersect one or more surfaces of geometry in the one or more voxels. In addition, the method includes rendering one or more graphics images based on the one or more hit points that are stored.

Another embodiment of the present disclosure sets forth a computer-implemented method for storing a hit point. The method includes tracing a ray through a graphics scene to the hit point at which the ray intersects a surface of geometry within a voxel of a grid, where a signed distance function is defined on the grid. In addition, the method includes storing a representation of the hit point that comprises either one or two coordinate values in a coordinate frame associated with the voxel.

Other embodiments of the present disclosure include, without limitation, one or more computer-readable media including instructions for performing one or more aspects of the disclosed techniques as well as one or more computing systems for performing one or more aspects of the disclosed techniques.

At least one technical advantage of the disclosed techniques relative to the prior art is that the disclosed techniques store hit points in formats that help to avoid self-intersections and incorrectly traced shadow rays when rendering SDFs. Consequently, images rendered using the disclosed techniques can include fewer artifacts than are found in images rendered using conventional techniques, which increases overall image quality relative to what can be achieved with conventional techniques. In addition, the disclosed techniques permit hit points to be stored in formats that require less memory than conventional formats. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
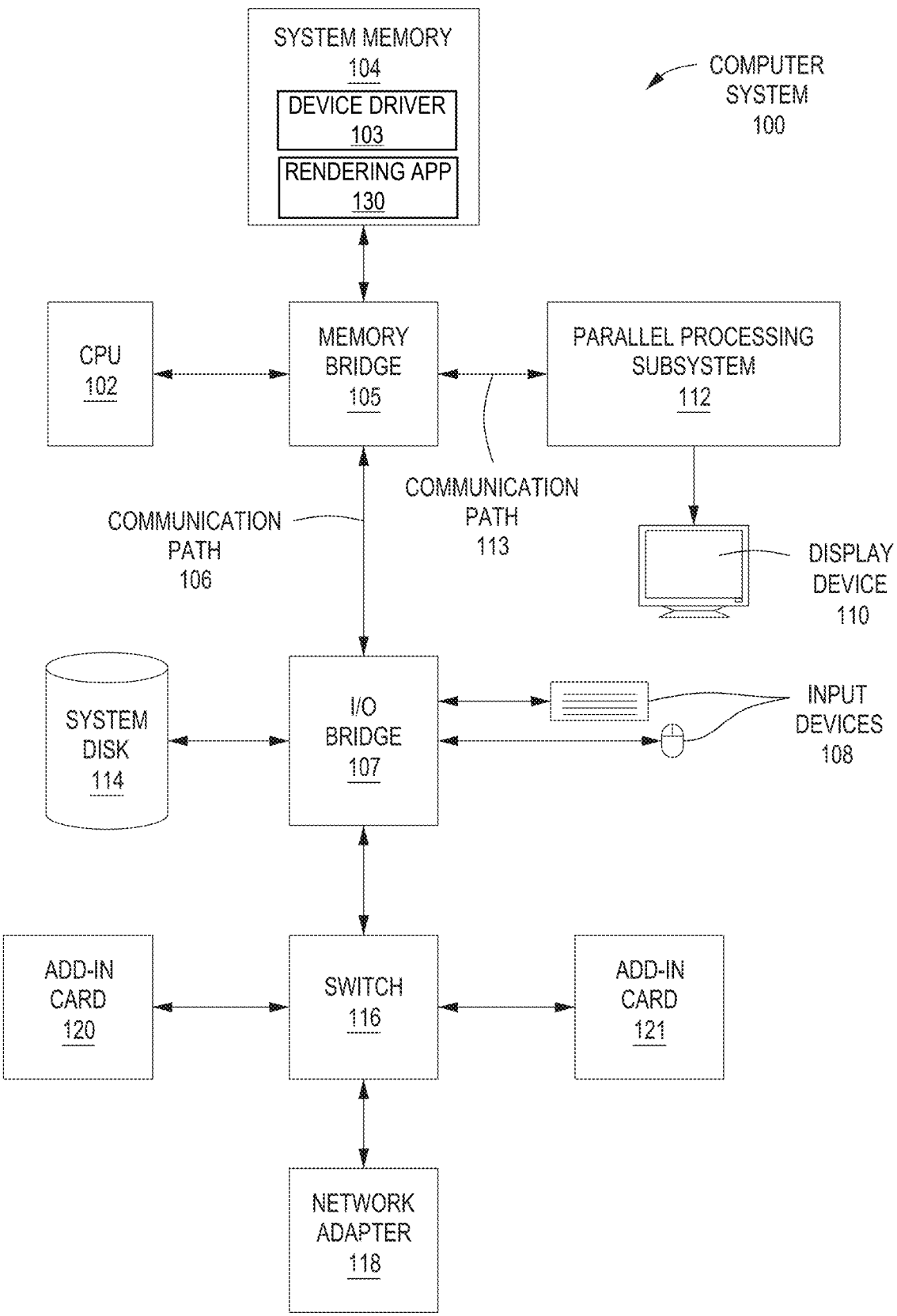
FIG. 1 is a block diagram illustrating a computer system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

General Overview

Embodiments of the present disclosure provide improved techniques for rendering SDFs. The improved techniques for rendering SDFs have many real-world applications, including video games, film production rendering, architectural and design applications, and any other applications in which images can be rendered using ray tracing. In the improved techniques for rendering SDFs, when a ray is traced into a graphics scene that includes one or more surfaces of geometry defined by an SDF, a hit point at which the ray intersects a surface is stored in a compact representation that requires less memory resources than conventional techniques for storing the hit point. In some embodiments, the compact representation can include an identifier associated with a voxel of an SDF grid in which the hit point lies, as well as x, y, and z coordinates of the hit point in a canonical space of a coordinate frame associated with the voxel. In some embodiments, the compact representation can include the identifier of the voxel and two coordinates of the hit point in the canonical space that are associated with axes that the normal to a surface within the voxel is not most parallel with. One or more continuation rays, such as shadow rays, reflection rays, and/or refraction rays, can be traced beginning from the stored hit point. When the hit point is stored in the compact representation that includes two coordinates, a third coordinate can be computed from the two coordinates with greater accuracy than if the third coordinate had been stored.

The techniques for rendering SDFs of the present disclosure have many real-world applications. For example, the techniques for rendering SDFs can be used to render images and/or frames within a video game. As a particular example, the techniques for rendering SDFs could be performed by a cloud-based graphics processing platform, such as a cloud-based gaming platform, that executes video games and streams videos of game sessions to client devices. The disclosed techniques for rendering SDFs require less memory resources than conventional techniques for rendering SDFs. The rendered images and/or frames may also appear more realistic, with fewer artifacts than images and/or frames rendered using some other conventional rendering techniques.

As another example, the techniques for rendering SDFs can be used in the production-quality rendering of films. The production of animated films as well as computer-generated imagery (CGI) and special effects within live action films, often requires high-quality rendering of frames of those films. The disclosed techniques for rendering SDFs can be used to render the frames of a film more correctly and/or using less memory resources than some other conventional rendering techniques.

As yet another example, the disclosed techniques for rendering SDFs can be used to render the designs of architectural structures and other objects. Architectural and design applications oftentimes provide renderings to show how particular designs would look in real life. The disclosed techniques for rendering SDFs can be used to render images of designs more correctly and/or using less memory resources than some other conventional rendering techniques.

The above examples are not in any way intended to be limiting. As persons skilled in the art will appreciate, as a general matter, the techniques for rendering SDFs described herein can be implemented in any application where convention ray tracing and/or techniques for rendering SDFs are currently employed.

System Overview

FIG. 1 is a block diagram illustrating a computer system 100 configured to implement one or more aspects of various embodiments. As persons skilled in the art will appreciate, computer system 100 can be any type of technically feasible computer system, including, without limitation, a server machine, a server platform, a desktop machine, laptop machine, a hand-held/mobile device, or a wearable device. In some embodiments, computer system 100 is a server machine operating in a data center or a cloud computing environment that provides scalable computing resources as a service over a network.

In various embodiments, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In one embodiment, I/O bridge 107 is configured to receive user input information from optional input devices 108, such as a keyboard or a mouse, and forward the input information to CPU 102 for processing via communication path 106 and memory bridge 105. In some embodiments, computer system 100 may be a server machine in a cloud computing environment. In such embodiments, computer system 100 may not have input devices 108. Instead, computer system 100 may receive equivalent input information by receiving commands in the form of messages transmitted over a network and received via the network adapter 118. In one embodiment, switch 116 is configured to provide connections between I/O bridge 107 and other components of the computer system 100, such as a network adapter 118 and various add-in cards 120 and 121.

In one embodiment, I/O bridge 107 is coupled to a system disk 114 that may be configured to store content and applications and data for use by CPU 102 and parallel processing subsystem 112. In one embodiment, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to an optional display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in conjunction with FIGS. 2-3, such circuitry may be incorporated across one or more parallel processing units (PPUs), also referred to herein as parallel processors, included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver configured to manage the processing operations of the one or more PPUs within parallel processing subsystem 112. In addition, the system memory 104 includes a rendering application 130. The rendering application 130 can be any technically-feasible application that renders virtual 3D scenes, and rendering the scenes can include rendering SDFs according to techniques disclosed herein. For example, the rendering application 130 could be a gaming application or a rendering application that is used in film production. Although described herein primarily with respect to the rendering application 130, techniques disclosed herein can also be implemented, either entirely or in part, in other software and/or hardware, such as in the parallel processing subsystem 112.

In various embodiments, parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

In one embodiment, CPU 102 is the master processor of computer system 100, controlling and coordinating operations of other system components. In one embodiment, CPU 102 issues commands that control the operation of PPUs. In some embodiments, communication path 113 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other embodiments, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. In certain embodiments, one or more components shown in FIG. 1 may not be present. For example, switch 116 could be eliminated, and network adapter 118 and add-in cards 120, 121 would connect directly to I/O bridge 107. Lastly, in certain embodiments, one or more components shown in FIG. 1 may be implemented as virtualized resources in a virtual computing environment, such as a cloud computing environment. In particular, the parallel processing subsystem 112 may be implemented as a virtualized parallel processing subsystem in some embodiments. For example, the parallel processing subsystem 112 could be implemented as a virtual graphics processing unit (GPU) that renders graphics on a virtual machine (VM) executing on a server machine whose GPU and other physical resources are shared across multiple VMs.

Figure 2:
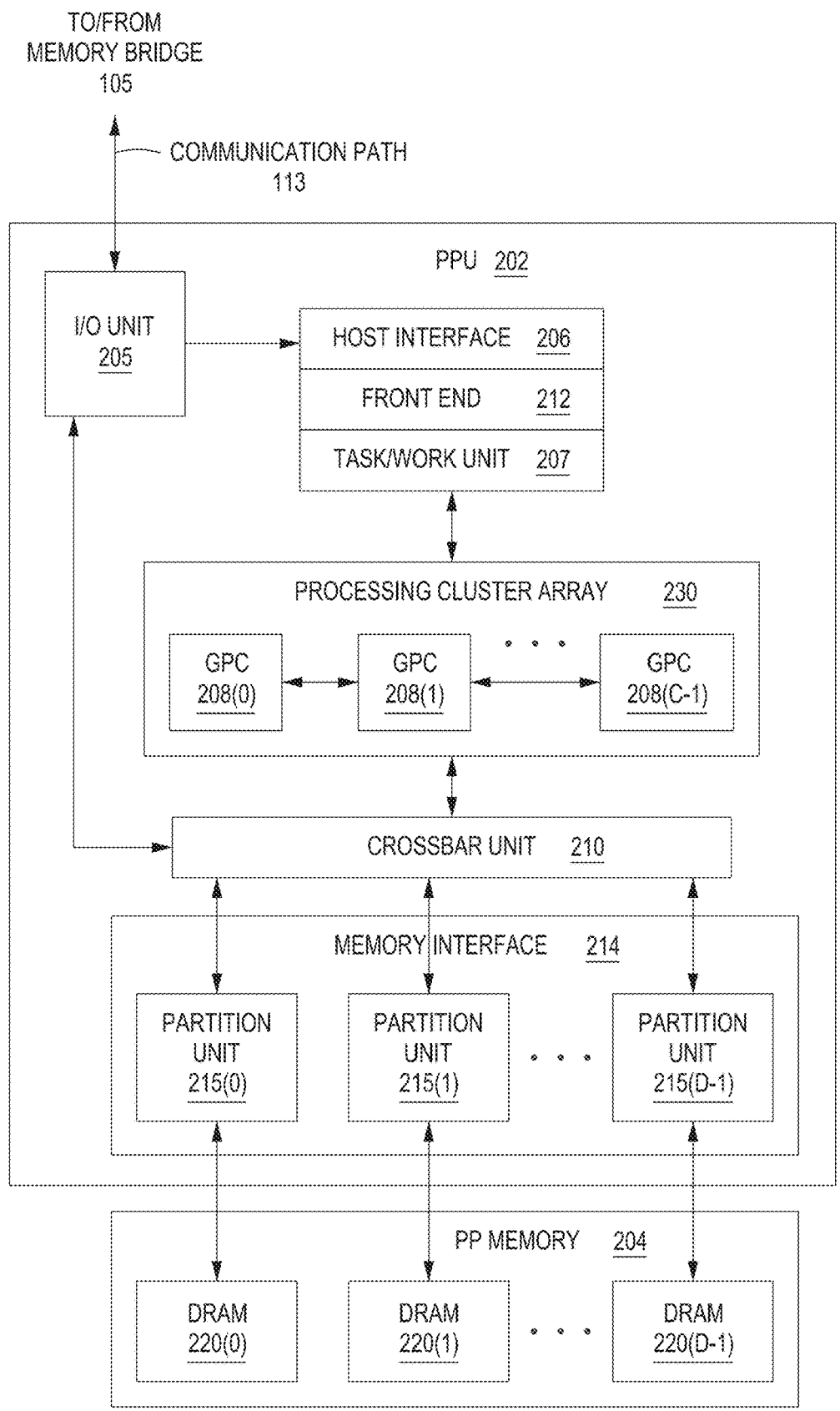
FIG. 2 is a block diagram of a parallel processing unit included in the parallel processing subsystem of FIG. 1, according to various embodiments.

FIG. 2 is a block diagram of a parallel processing unit (PPU) 202 included in the parallel processing subsystem 112 of FIG. 1, according to various embodiments. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a GPU that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to an optional display device 110 for display. In some embodiments, PPU 202 also may be configured for general-purpose processing and compute operations. In some embodiments, computer system 100 may be a server machine in a cloud computing environment. In such embodiments, computer system 100 may not have a display device 110. Instead, computer system 100 may generate equivalent output information by transmitting commands in the form of messages over a network via the network adapter 118.

In some embodiments, CPU 102 is the master processor of computer system 100, controlling and coordinating operations of other system components. In one embodiment, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a command queue, also referred to herein as a pushbuffer, to initiate processing of the stream of commands in the data structure. In one embodiment, the PPU 202 reads command streams from the command queue and then executes commands asynchronously relative to the operation of CPU 102. In embodiments where multiple pushbuffers are generated, execution priorities may be specified for each pushbuffer by an application program via device driver to control scheduling of the different pushbuffers.

In one embodiment, PPU 202 includes an I/O (input/output) unit 205 that communicates with the rest of computer system 100 via the communication path 113 and memory bridge 105. In one embodiment, I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. In one embodiment, host interface 206 reads each command queue and transmits the command stream stored in the command queue to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In one embodiment, front end 212 transmits processing tasks received from host interface 206 to a work distribution unit (not shown) within task/work unit 207. In one embodiment, the work distribution unit receives pointers to processing tasks that are encoded as task metadata (TMD) and stored in memory. The pointers to TMDs are included in a command stream that is stored as a command queue and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. Also for example, the TMD could specify the number and configuration of the set of CTAs. Generally, each TMD corresponds to one task. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

In one embodiment, PPU 202 implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

In one embodiment, memory interface 214 includes a set of D of partition units 215, where D≥1. Each partition unit 215 is coupled to one or more dynamic random access memories (DRAMs) 220 residing within PPM memory 204. In some embodiments, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

In one embodiment, a given GPC 208 may process data to be written to any of the DRAMs 220 within PP memory 204. In one embodiment, crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In some embodiments, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

In one embodiment, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

In one embodiment, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, wearable devices, servers, workstations, game consoles, embedded systems, and the like.

Figure 3:
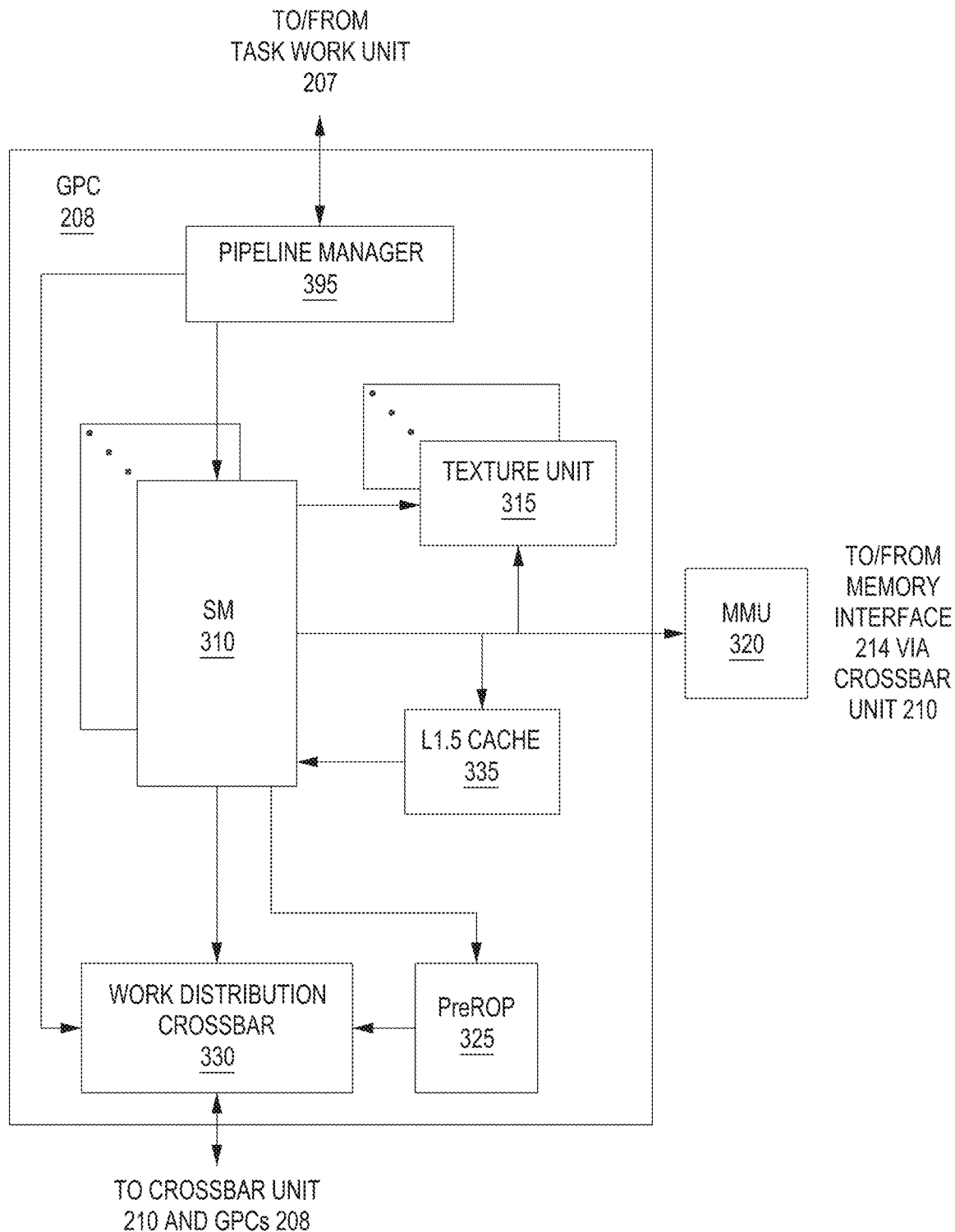
FIG. 3 is a block diagram of a general processing cluster included in the parallel processing unit of FIG. 2, according to various embodiments.

FIG. 3 is a block diagram of a general processing cluster (GPC) 208 included in the parallel processing unit (PPU) 202 of FIG. 2, according to various embodiments. As shown, the GPC 208 includes, without limitation, a pipeline manager 305, one or more texture units 315, a preROP unit 325, a work distribution crossbar 330, and an L1.5 cache 335.

In one embodiment, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

In one embodiment, operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In various embodiments, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, 5OR), bit-shifting, and computation of various algebraic functions (e.g., planar interpolation and trigonometric, exponential, and logarithmic functions, etc.). Advantageously, the same functional execution unit can be configured to perform different operations.

In one embodiment, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, in one embodiment, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310. In some embodiments, a single SM 310 may simultaneously support multiple CTAs, where such CTAs are at the granularity at which work is distributed to the SMs 310.

In one embodiment, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

In one embodiment, each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In one embodiment, in graphics and compute applications, GPC 208 may be configured such that each SM 310 is coupled to a texture unit 315 for performing texture mapping operations, such as determining texture sample positions, reading texture data, and filtering texture data.

In one embodiment, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs.

Figure 4:
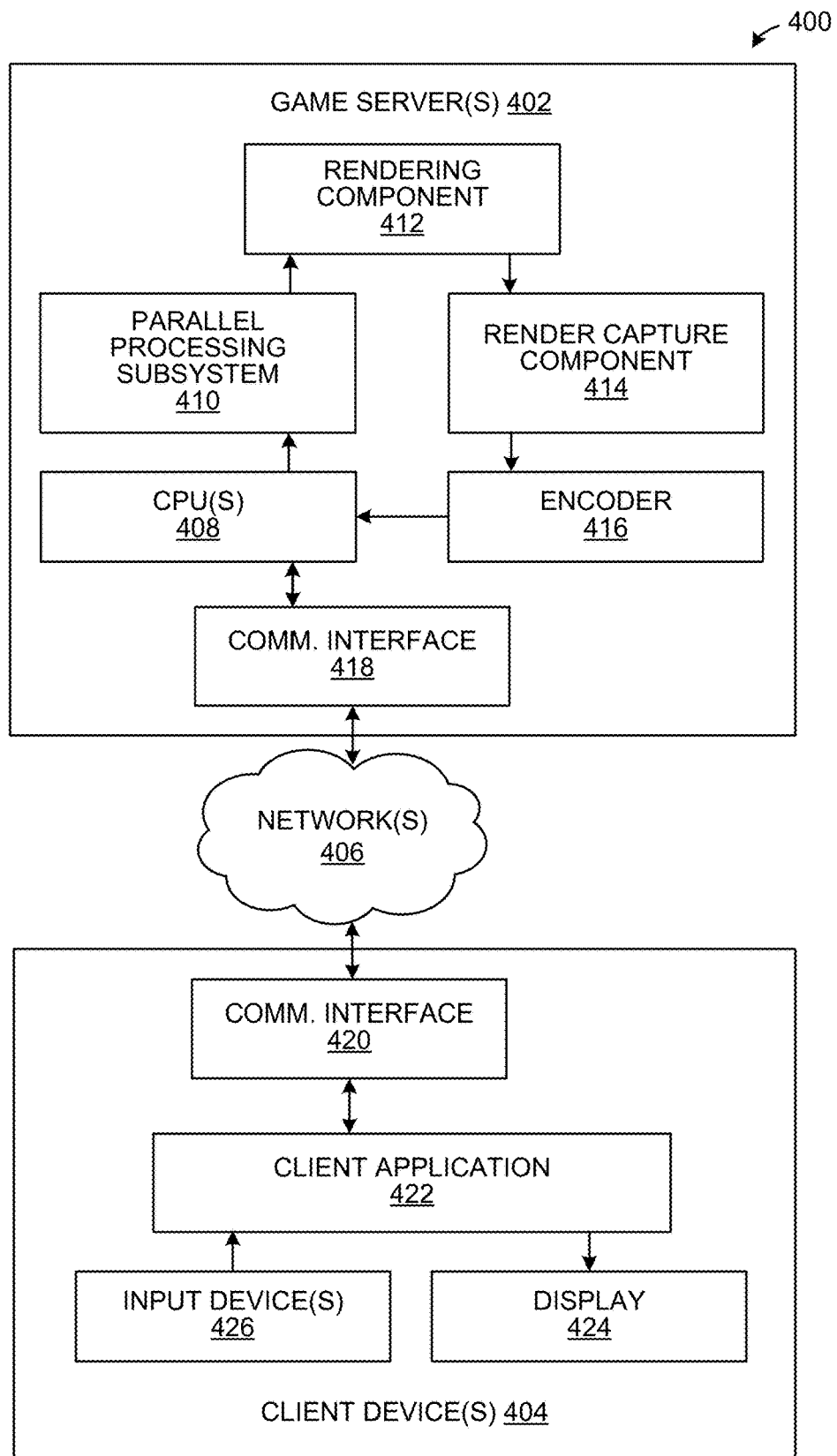
FIG. 4 is a block diagram illustrating an exemplary cloud computing system, according to various embodiments.

FIG. 4 is a block diagram illustrating an exemplary cloud computing system, according to various embodiments. As shown, a computing system 400 includes server(s) 402 that are in communication with client device(s) 404 via network(s) 406. Each of the server(s) 402 may include similar components, features, and/or functionality as the exemplary computer system 100, described above in conjunction with FIG. 1-3. Each of the server(s) 402 may be any technically feasible type of computer system, including, without limitation, a server machine or a server platform. Each of the client devices(s) 402 may also include similar components, features, and/or functionality as the computer system 100, except each client device 402 executes a client application 422 rather than the rendering application 130. Each of the client device(s) 402 may be any technically feasible type of computer system including, without limitation, a desktop machine, a laptop machine, a hand-held/mobile device, and/or a wearable device. In some embodiments, one or more of the server(s) 402 and/or the client device(s) 404 may be replaced with virtualized processing environment(s), such as virtualized processing environment(s) provided by one or more VMs and/or containers that execute on underlying hardware system(s). The network(s) 406 may include any type of network(s), such as one or more local area networks (LANs) and/or wide area networks (WANs) (e.g., the Internet).

In some embodiments, the server(s) 400 may be included in a cloud computing system, such a public cloud, a private cloud, or a hybrid cloud, and/or in a distributed system. For example, the server(s) 400 could implement a cloud-based gaming platform that provides a game streaming service, also sometimes referred to as "cloud gaming," "gaming on demand," or "gaming-as-a-service." In such a case, games that are stored and executed on the server(s) 400 are streamed as videos to the client device(s) 402 via client application(s) 422 running thereon. During game sessions, the client application(s) 422 handle user inputs and transmit those inputs to the server(s) 400 for in-game execution. Although cloud-based gaming platforms are described herein as a reference example, persons skilled in the art will appreciate that, as a general matter, the server(s) 400 may execute any technically feasible types of application(s), such as the design applications described above.

As shown, each of the client device(s) 404 includes input device(s) 426, the client application 422, a communication interface 420, and a display 424. The input device(s) 426 may include any type of device(s) for receiving user input, such as a keyboard, a mouse, a joystick, and/or a game controller. The client application 422 receives input data in response to user inputs at the input device(s) 426, transmits the input data to one of the server(s) 402 via the communication interface 420 (e.g., a network interface controller) and over the network(s) 406 (e.g., the Internet), receives encoded display data from the server 402, and decodes and causes the display data to be displayed on the display 424 (e.g., a cathode ray tube, liquid crystal display, light-emitting diode display, or the like). As such, more computationally intense computing and processing can be offloaded to the server(s) 402. For example, a game session could be streamed to the client device(s) 404 from the server(s) 402, thereby reducing the requirements of the client device(s) 404 for graphics processing and rendering.

As shown, each of the server(s) 402 includes a communication interface 418, CPU(s) 408, a parallel processing subsystem 410, a rendering component 412, a render capture component 414, and an encoder 416. Input data transmitted by the client device 404 to one of the server(s) 402 is received via the communication interface 418 (e.g., a network interface controller) and processed via the CPU(s) 408 and/or the parallel processing subsystem 410 included in that server 402, which correspond to the CPU 102 and the parallel processing subsystem 112, respectively, of the computer system 100 described above in conjunction with FIGS. 1-3. In some embodiments, the CPU(s) 408 may receive the input data, process the input data, and transmit data to the parallel processing subsystem 410. In turn, the parallel processing subsystem 410 renders one or more standalone images and/or image frames, such as the frames of a video game, based on the transmitted data.

Illustratively, the rendering component 412 employs the parallel processing subsystem 112 to render the result of processing the input data, and the render capture component 414 captures the rendering as display data (e.g., as image data capturing standalone image(s) and/or image frame(s)). The rendering performed by the rendering component 412 may include ray- or path-traced lighting and/or shadow effects, computed using one or more parallel processing units-such as GPUs, which may further employ the use of one or more dedicated hardware accelerators or processing cores to perform ray or path-tracing techniques—of the server 402. In some embodiments, the rendering component 412 performs rendering using the techniques for rendering SDFs disclosed herein. Thereafter, the encoder 416 encodes display data capturing the rendering to generate encoded display data that is transmitted, over the network(s) 406 via the communication interface 418, to the client device(s) 422 for display to user(s). In some embodiments, the rendering component 412, the render capture component 414, and the encoder 416 may be included in the rendering application 130, described above in conjunction with FIG. 1.

Returning to the example of cloud gaming, during a game session, input data that is received by one of the server(s) 402 may be representative of movement of a character of the user in a game, firing a weapon, reloading, passing a ball, turning a vehicle, etc. In such a case, the rendering component 412 may generate a rendering of the game session that is representative of the result of the input data, and the render capture component 414 may capture the rendering of the game session as display data (e.g., as image data capturing rendered frames of the game session). Parallel processing (e.g., GPU) resources may be dedicated to each game session, or resource scheduling techniques may be employed to share parallel processing resources across multiple game sessions. In addition, the game session may be rendered using the techniques for rendering SDFs disclosed herein. The rendered game session may then be encoded, by the encoder 416, to generate encoded display data that is transmitted over the network(s) 406 to one of the client device(s) 404 for decoding and output via the display 424 of that client device 404.

It will be appreciated that the architecture described herein is illustrative and that variations and modifications are possible. Among other things, any number of processing units, such as the SMs 310, texture units 315, or preROP units 325, described above in conjunction with FIG. 3, may be included within GPC 208.

Avoiding Self-Intersections when Rendering Signed Distance Functions

Figure 5:
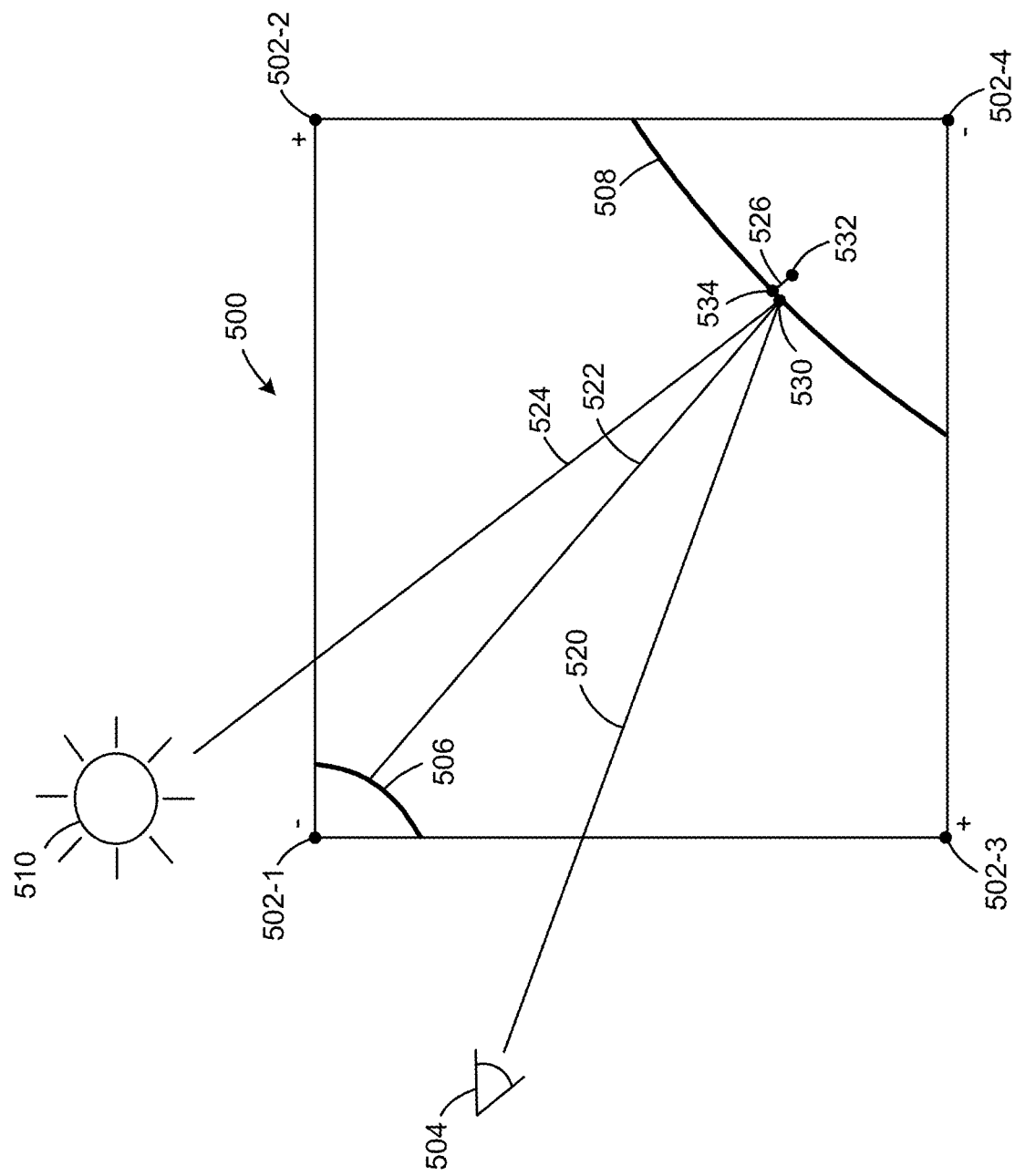
FIG. 5 illustrates exemplar rays being traced through a virtual three-dimensional scene, according to various embodiments.

FIG. 5 illustrates exemplar rays being traced through a virtual three-dimensional scene, according to various embodiments. As shown, a ray 520 is traced from a viewer 504 through a pixel (not shown) in a screen space into a scene that includes two objects 506 and 508. In some embodiments, geometry of the objects 506 and 508 are specified using one or more signed distance functions (SDFs). As described, an SDF specifies distances from points in space to the boundaries of one or more objects. At a given point, a positive distance indicates that the point is outside of an object, and a negative distance indicates that the point is inside an object.

In some embodiments, the data structure used to represent an SDF is a 3D grid that includes $n_x \times n_y \times n_z$ locations, with each location holding a signed distance value. Such a data structure is also referred to herein as an "SDF grid," or simply a "grid." As used herein, voxels of a grid are cells of the grid in 3D space with 2×2×2 signed distance values specified at the corners of the cells. For example, in some embodiments, SDF primitives and operators are sampled onto a grid, and each voxel corner stores a signed distance value from the sampling.

As shown in FIG. 5, a positive value at each corner 502-2 and 502-3 of a voxel 500 indicates a distance from the corner 502-2 or 502-3 to the surface of geometry of a nearest object that the corner 502-2 or 502-3 is outside of. Conversely, a negative value at each corner 502-1 and 502-4 indicates a distance from the corner 502-1 or 502-4 to the surface of geometry of a nearest object that the corner 502-1 or 502-4 is inside of.

Illustratively, when the ray 520 is traced through the scene, the ray 520 intersects a surface of geometry of the object ("surface of the object") 508 at a hit point 530. One or more continuation rays, shown as a reflection ray 522 and a shadow ray 524, can then be traced through the scene, beginning from the hit point 530. However, tracing continuation rays from hit points when intersections are found is oftentimes impractical. In such cases, the hit points need to be stored until continuation rays are traced from reconstructions of the stored hit points. However, due to limits in the accuracy of storing hit points, the hit points can be reconstructed incorrectly when continuation rays are traced. Illustratively, the hit point 530 is stored, and the stored hit point is used to reconstruct a hit point 532. For example, according to convention techniques, the reconstructed hit point 532 can be reconstructed based on an origin of the ray 520, a distance from the origin that the hit point 530 is stored as, and a known direction of the ray 520. However, the reconstructed hit point 532 is located within the object 508. As a result, a shadow ray 526 that is traced from the reconstructed hit point 532 intersects the surface of the object 508 again, which is also referred to herein as a "self-intersection." As described, self-intersections are unwanted and can result in artifacts in a rendered image, such as black pixels where there should be none.

To avoid self-intersections, some embodiments store each hit point in a representation that includes an identifier associated with a voxel (e.g., voxel 500) of an SDF grid in which a hit point lies, as well as x, y, and z coordinates of the hit point in a canonical space of a local coordinate frame associated with the voxel. In some other embodiments, each hit point can be stored in a representation that includes an identifier of the voxel in which a hit point lies and two coordinates of the hit point in a canonical space associated with the voxel. In such cases, the two coordinates are associated with axes that the normal to a surface (e.g., the surface of the object 508) within the voxel is not most parallel with, as discussed in greater detail below.

In some embodiments, trilinear interpolation can be used to determine the surfaces of object(s) within each voxel of an SDF grid during ray tracing. A surface is defined by the zero level set of an SDF inside a voxel. Given 2×2×2 signed distance values $s_{ijk}$, with i, j, k∈[0,1], in a single voxel, the equation for trilinear interpolation is:

$$f(x,y,z)=(1-z)((1-y)((1-x)s_{000}+xs_{100})+y((1-x)s_{010}+xs_{110}))+z((1-y)((1-x)s_{001}+x)s_{101}+xs_{101})+y((1-x)s_{011}+xs_{111})), \quad (1)$$

where x, y, z∈[0,1]. In equation (1), the surface inside a voxel is defined by $f(x, y, z)=0$, and $$z = \frac{k_0 + k_1 x + k_2 y + k_3 xy}{k_4 + k_5 x + k_6 y + k_7 xy}, \quad (2)$$

which is a rational bilinear patch. In equation (2), the constants $k_i$ are functions of the $s_{ijk}$ distances:

$$k_0=s_{000}, k_1=s_{100}-s_{000}, k_2=s_{010}-s_{000}, k_3=s_{110}-s_{010}-k_1,$$
$$k_4=k_0-s_{001}, k_5=k_1-b, k_6=k_2-(s_{011}-s_{001}), k_7=k_3-(s_{111}-s_{011}-b), \quad (3)$$

where $b=s_{101}-s_{001}$.

In some embodiments, in order to determine an intersection between ray and a surface inside a voxel, a PPU 202 first determines an intersection between the ray and the voxel, and then the PPU 202 determines an intersection of the ray with the surface by solving for a hit point where the function $f(x, y, z)$ of equation (1) equals 0. The intersection between the ray and the voxel can be determined in any technically feasible manner. For example, the intersection can be obtained by providing voxels of an SDF grid to dedicated hardware in the PPU 202 that performs a sparse voxel set (SVS) technique and returns the intersection. As another example, the intersection can be determined by tracing the ray to the voxel using a grid sphere tracing (GST) technique, a sparse brick set (SBS) technique, or a sparse voxel octree (SVO) technique.

Assuming that the ray does not originate inside the voxel, then in some embodiments, the intersection point between the ray and the voxel can be used as a new origin of the ray when computing the intersection between the ray and the surface inside the voxel. In such cases, the new origin can also be transformed to the canonical space, namely $[0,1]^3$, of a local coordinate frame associated with the voxel. The intersection of the ray with the surface inside the voxel is then defined by the hit point (x, y, z) where $f(x, y, z)=0$, and x, y, z∈ $[0,1]^3$ in the canonical space. The coordinates (x, y, z) of the hit point are also referred to herein as "voxel unit coordinates." In addition, when a ray originates within a voxel, then an origin of the ray can be transformed to the canonical space of a local coordinate frame associated with the voxel in a similar manner.

In some embodiments, the PPU 202 computes the hit point and returns (1) an identifier of the voxel that the ray intersects, and (2) three voxel unit coordinates. In such cases, the rendering application 130 can store a representation of the hit point that includes (1) the identifier of the voxel, and (2) the three voxel unit coordinates (e.g., each of which is stored as a 16 bit fixed-point integer representing a number in [0,1]). In some embodiments, the PPU 202 further computes an axis of the local coordinate frame associated with the voxel 500 that a normal to the surface 508 is most parallel with, and the PPU 202 returns (1) an identifier of the voxel that the ray intersects, and (2) two of the voxel unit coordinates that are along axes of the coordinate frame that the normal to the surface 508 is not most parallel with. In such cases, the rendering application 130 can store a representation of the hit point that includes (1) the identifier of the voxel, and (2) the two voxel unit coordinates (e.g., as two 16 bit fixed-point integers that each representing a number in [0,1]), as discussed in greater detail below in conjunction with FIG. 6B. When the stored hit point needs to be used, such as to trace a continuation ray, the rendering application 130 can reconstruct the hit point by computing the voxel unit coordinate that is not stored from the two voxel unit coordinates that are stored. For example, in some embodiments, the computation can be performed via a PPU 202.

Figure 6A:
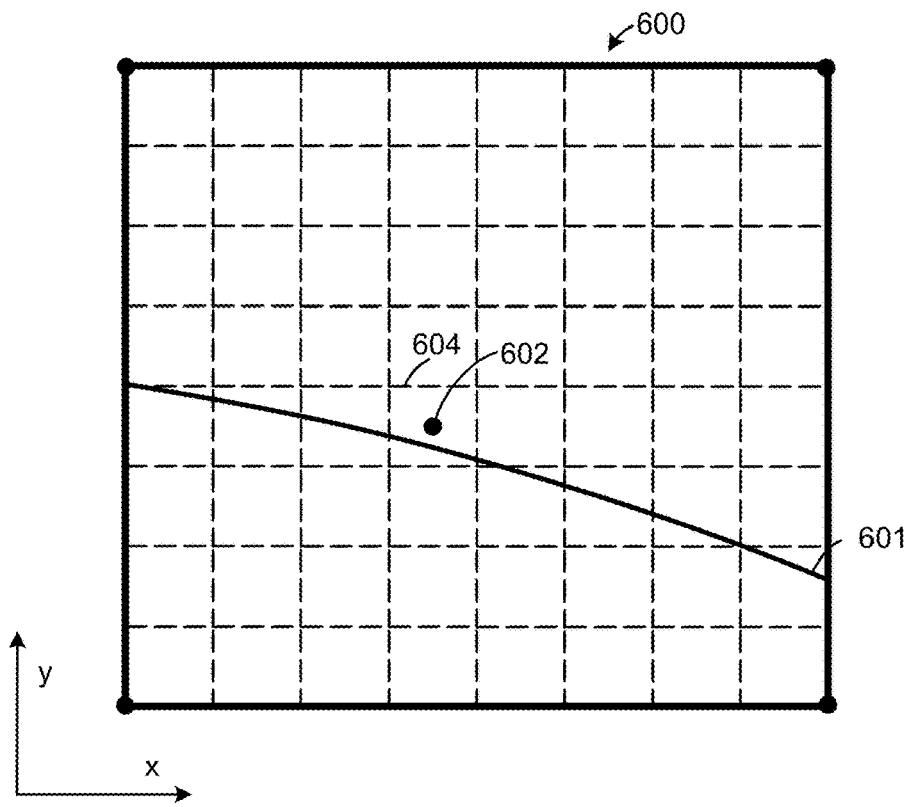
FIGS. 6A-6B illustrate approaches for storing hit points, according to various embodiments.
Figure 6B:
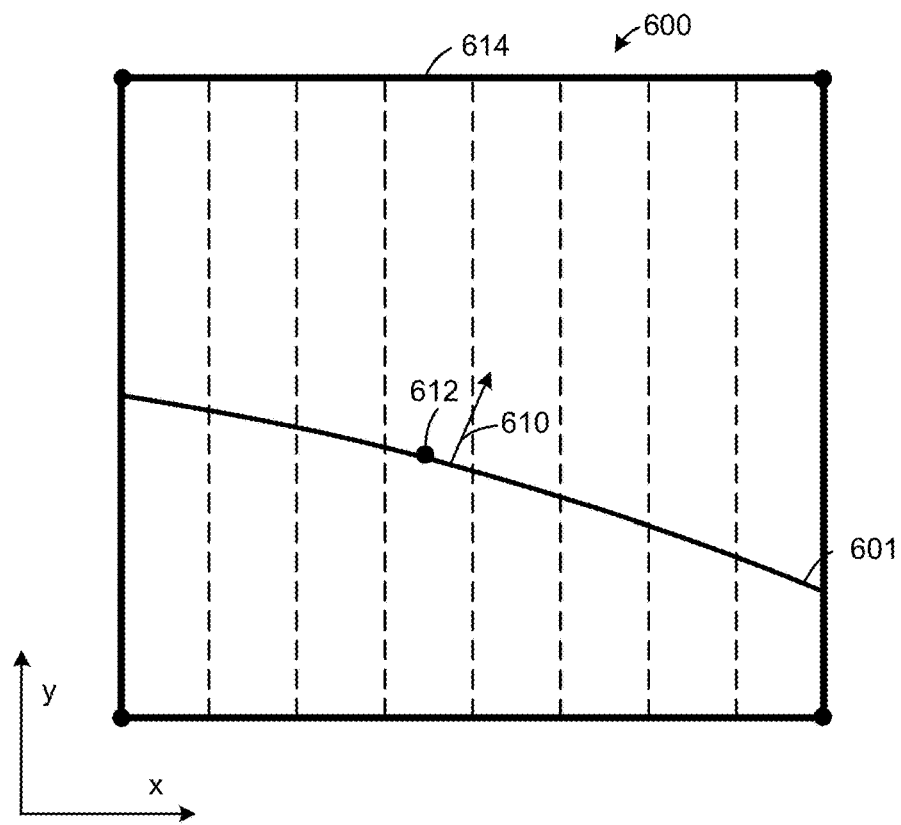

FIGS. 6A-6B illustrate approaches for storing hit points, according to various embodiments. Although FIGS. 6A-6B show two dimensional examples for illustrative purposes, in some embodiments, hit points can be stored in three dimensions for 3D graphics. As shown in FIG. 6A, in two dimensions, the stored representation of a hit point 602 can include the identifier of a voxel 600 that a ray (not shown) intersects, as well as voxel unit coordinates x and y of a hit point 602 within the voxel 600. The voxel unit coordinates x and y are coordinates in the canonical space of a local coordinate frame associated with the voxel 600. For example, in some embodiments, the identifier of the voxel 600 can be a location code to the voxel 600, and each of the x and y coordinates can be stored as a 16 bit fixed-point integer representing a number in [0,1]. Less precision (e.g., 16 bit fixed-point integers) can be used because the location of the voxel 600 is known and the x and y coordinates are in the canonical space of the local coordinate frame associated with the voxel 600. Illustratively, storing each of the x and y coordinates as 16 bit fixed-point integer representing a number in [0,1] is equivalent to storing a cell 604 of a grid in which the hit point 602 lies, because the limited accuracy of 16 bit fixed-point integers results in a discretization of the voxel 600, represented by the grid in FIG. 6A. In the three-dimensional case, three voxel unit coordinates x, y, and z can each be stored as 16 bit fixed-point integer representing a number in [0,1] in some embodiments. It should be understood that storing three 16 bit fixed-point integer requires less memory than storing a hit point with more precision, such as using 32 bit fixed-point integers.

As shown in FIG. 6B, in two dimensions, the stored representation of a hit point 612 can include the identifier of the voxel 600 in which a ray (not shown) intersects a surface 601 of geometry at the hit point 612, as well as a single voxel unit coordinate x of the hit point 612 in the canonical space of a local coordinate frame associated with the voxel 600. For example, in some embodiments, the identifier of the voxel 600 can be a location code to the voxel 600, and the x coordinate can be stored as a 16 bit fixed-point integer representing a number in [0,1]. Illustratively, storing the x coordinate as such a 16 bit fixed-point integer is equivalent to storing a slice 614 of the voxel 600 in which the hit point 612 lies, because the limited accuracy of 16 bit fixed-point integers results in a discretization of the voxel 600 that is represented by the slices in FIG. 6B. The y coordinate that is not stored can be computed from the x coordinate that is stored, as discussed in greater detail below. Illustratively, a computed y coordinate of the hit point 612 is more accurate than the stored y coordinate of the hit point 602, described above in conjunction with FIG. 6A, because the hit point 612 is closer to the surface 601 than the hit point 602. In three dimensions, two voxel unit coordinates can be stored, and a third voxel unit coordinate can be computed in some embodiments. For example, in some embodiments, the two voxel unit coordinates can each be stored as 16 bit fixed-point integer representing a number in [0,1]. It should be understood that storing two 16 bit fixed-point integers requires less memory than storing three 16 bit fixed-point integers, described above in conjunction with FIG. 6A, or storing the hit point with more precision, such as using 32 bit fixed-point integers. Accordingly, storing two voxel unit coordinates enables improved accuracy and a smaller memory footprint relative to storing three voxel unit coordinates.

In some embodiments, the stored voxel unit coordinate(s) (e.g., the x coordinate in FIG. 6B) are along ax(es) of the local coordinate frame associated with a voxel that the normal to a surface of geometry within the voxel is not most parallel with. Illustratively, a normal 610 to the surface 601 is not most parallel with the y axis. Accordingly, an x coordinate of the hit point is stored, and a y coordinate is computed using the x coordinate to reconstruct the hit point 612. The axis for which a component is not stored is the axis that is most parallel to the average normal of the surface within the voxel. Computing the coordinate along an axis that the surface normal is most parallel to (and storing the other coordinates) provides improved accuracy relative to computing the other coordinates.

In three dimensions, the z coordinate of a hit point can be computed from stored x and y coordinates using equation (2). In addition, equation (2) can be rewritten so that x is a function of y and z, i.e., $$x = \frac{k_0 + k_2 y + k_4 z + k_6 yz}{-k_1 - k_3 y + k_5 z + k_7 yz}, \tag{4}$$

and so that y is a function of x and z, i.e., $$y = \frac{k_0 + k_1 x - k_4 z - k_5 xz}{-k_2 - k_3 x + k_6 z + k_7 xz}. \tag{5}$$

In order to determine which axis of the local coordinate frame associated with a voxel the normal to a surface of geometry within the voxel is most parallel to, the sums of absolute differences in x, y, and z can be computed as:

$$d_x = |s_{100} - s_{000}| + |s_{101} - s_{001}| + |s_{110} - s_{010}| + |s_{111} - s_{011}|, \quad (6)$$

$$d_y = |s_{010} - s_{000}| + |s_{011} - s_{001}| + |s_{110} - s_{100}| + |s_{111} - s_{011}|,$$

$$d_z = |s_{001} - s_{000}| + |s_{011} - s_{010}| + |s_{101} - s_{100}| + |s_{111} - s_{110}|.$$

In some embodiments, if $d_x$ is the largest of $(d_x, d_y, d_z)$, then the y and z coordinates are stored, and the x coordinate is reconstructed from the stored y and z coordinates using equation (4). If $d_y$ is the largest of $(d_x, d_y, d_z)$, then the x and z coordinates are stored, and the y coordinate is reconstructed from the stored x and z coordinates using equation (5). If $d_z$ is the largest of $(d_x, d_y, d_z)$, then the x and y coordinates are stored, and the z coordinate is reconstructed from the stored x and y coordinates using equation (2). Selecting the coordinate associated with the largest sum of absolute differences is equivalent to choosing the x, y, or z axis that is most parallel to the normal of the surface. The reconstructed coordinate can have greater precision than a stored coordinate due to the usage of equations (2) and (4)-(5). The voxel unit coordinate that is most parallel to the surface normal should be reconstructed with greater precision, because such a voxel unit coordinate is most important to avoid self-intersections.

In some embodiments, the parallel processing subsystem 112 can include dedicated hardware that performs one or more of the techniques disclosed herein. For example, in some embodiments, the dedicated hardware can be SDF unit(s) in one or more PPUs 202 that compute the intersections of rays with voxel and the hit points at which those rays intersect surfaces of geometry within the voxels. In such cases, the SDF unit(s) can return identifiers of the voxels and either two or three voxel unit coordinates that are associated with each of the hit points, as described above in conjunction with FIGS. 6A-6B. Then, the rendering application 130 (or other software) can cause the returned identifiers and voxel unit coordinates to be stored in the PP memory 204 of the parallel processing subsystem 112 and/or elsewhere. In some other embodiments, one or more of the techniques disclosed herein can be implemented in software. For example, in some embodiments, the rendering application 130 (or other software) can implement computations of the intersections of rays with voxels and with surfaces of geometry within the voxels at hit points. In such cases, the computations can be executed on the parallel processing subsystem 112 and/or elsewhere (e.g., the CPU 102), and the rendering application 130 (or other software) can cause identifiers of the voxels and either two or three voxel unit coordinates that are associated with each hit point to be stored in the PP memory 204 of the parallel processing subsystem 112 and/or elsewhere. In addition, the parallel processing subsystem 112 can implement an instruction to reconstruct a hit point from, e.g., two voxel unit coordinates in some embodiments. In such cases, the rendering application 130 (or other software) can send the instruction to the parallel processing subsystem 112 for execution whenever a hit point needs to be reconstructed in order to trace a continuation ray. In some other embodiments, one or more of the techniques disclosed herein can be implemented in any technically feasible combination of hardware and/or software.

Figure 7A:
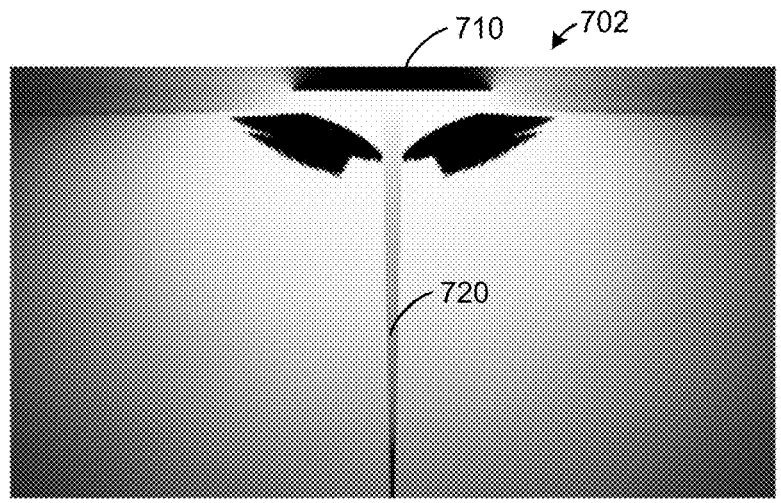
FIGS. 7A-7B illustrate exemplar images rendered using stored hit points, according to the prior art.
Figure 7B:
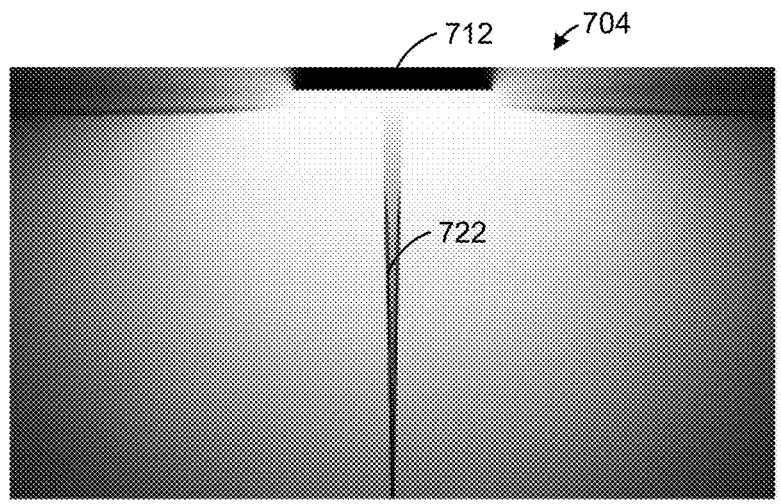

FIGS. 7A-7B illustrate exemplar images rendered using stored hit points, according to the prior art. As shown in FIG. 7A, a rendered image 702 includes a scene of a light 710 that illuminates a long sliver crack 720. To render the image 702, rays were tracing into a virtual scene, and hit points were stored as distances along the rays to surfaces of objects represented by an SDF. The stored hit points were then used to trace continuation rays beginning from those hit points. Illustratively, the image 702 includes a number of dark regions that include black pixels. The dark regions are artifacts resulting from self-intersections that are caused by the stored hit points being within the surfaces of objects represented by the SDF.

As shown in FIG. 7B, when an offset is added to the hit points that are stored as distances along rays, an image 704 can be rendered. Illustratively, the image 704 includes dark regions within a crack 722. The dark regions are artifacts resulting from self-intersections that are caused by the sum of the stored hit points and the offset being within the surfaces of objects represented by the SDF. In addition, the image 704 includes incorrect shadows around a light 712. The incorrect shadows are artifacts resulting from shadow rays being traced from offset hit points that are above the surfaces of objects represented by the SDF, rather than from hit points on the surfaces themselves.

Figure 7C:
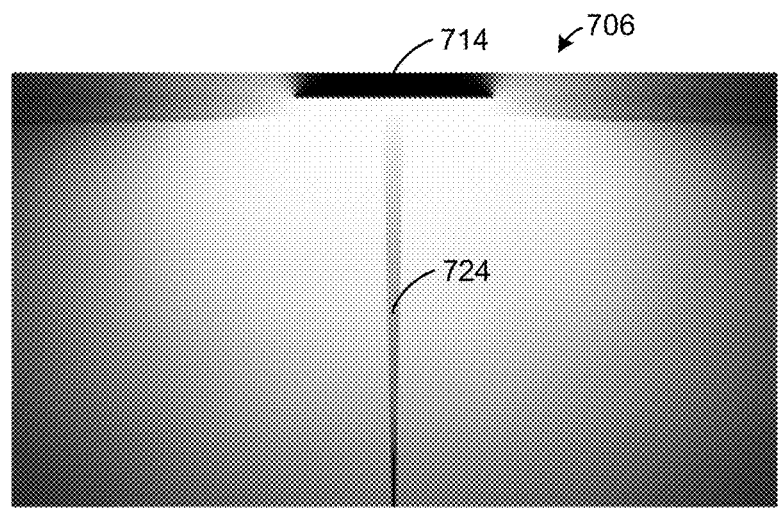
FIG. 7C illustrates an exemplar image rendered using stored hit points, according to various embodiments.

FIG. 7C illustrates an exemplar image rendered using stored hit points, according to various embodiments. As shown, when each hit point is stored in a representation that includes (1) an identifier of a voxel that an associated ray intersects, and (2) two voxel unit coordinates along axes that a normal to a surface of geometry within the voxel is not the most parallel with, as described above in conjunction with FIG. 6B, the stored hit points can be used to trace continuation rays and render an image 706 that includes fewer artifacts relative to the images 702 and 704.

Figure 8A:
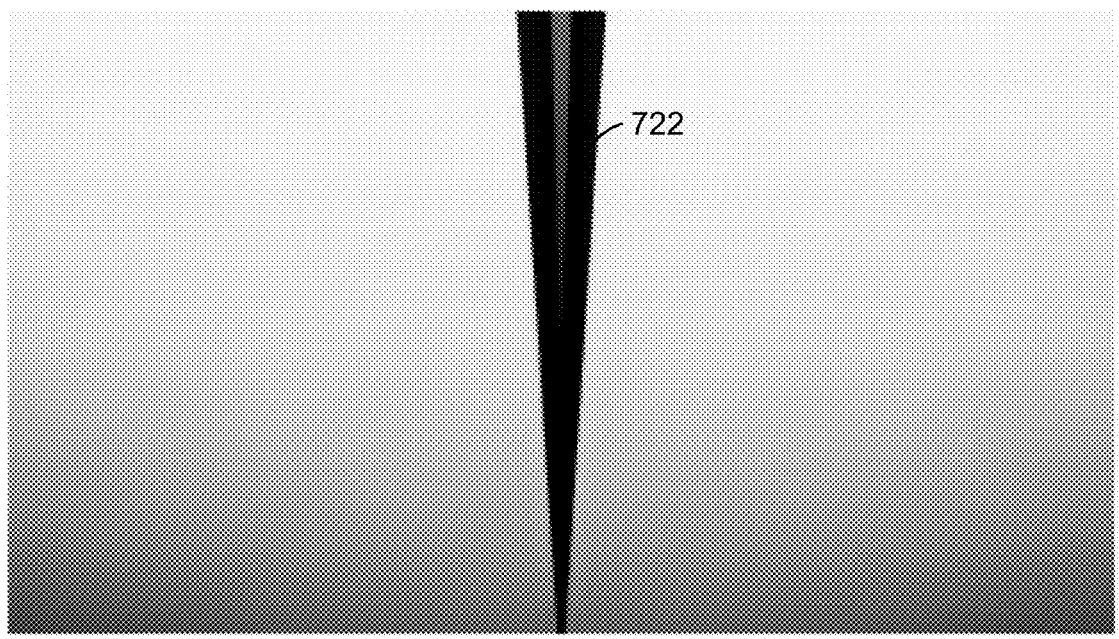
FIG. 8A illustrates a zoomed-in portion of the exemplar image of FIG. 7B, according to the prior art.

FIG. 8A illustrates a zoomed-in portion of the exemplar image 704 of FIG. 7B, according to the prior art. As shown, the image 704 includes dark regions in the crack 722. The dark regions are artifacts resulting from self-intersections that are caused by the sums of stored hit points and an offset for one side of the crack 722 falling within the other side of the crack 722.

Figure 8B:
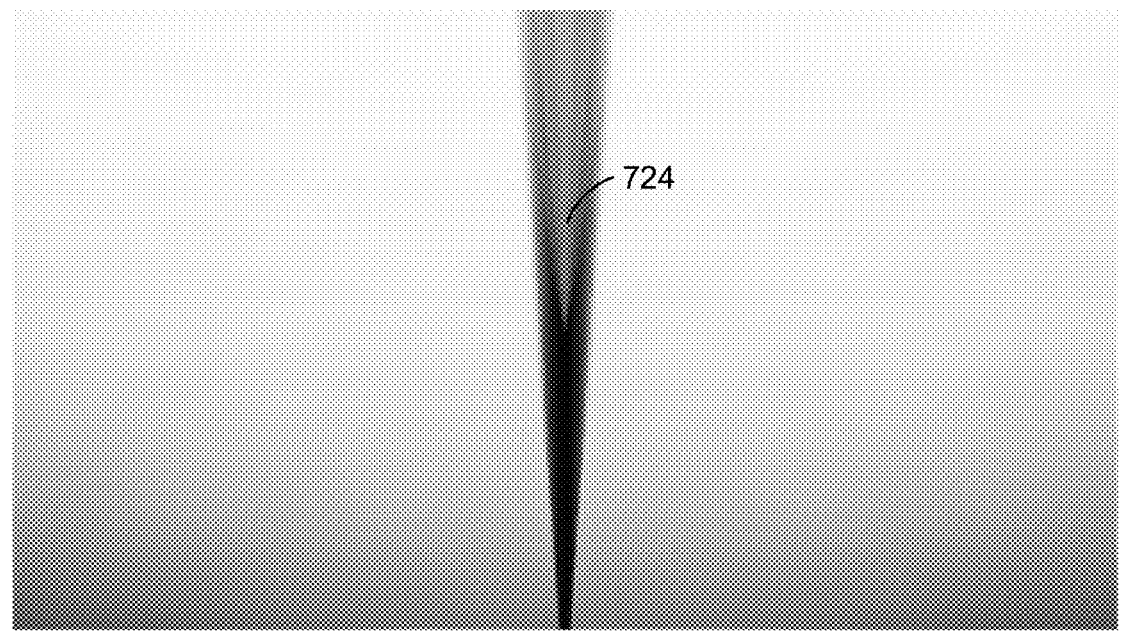
FIG. 8B illustrates a zoomed-in portion of the exemplar image of FIG. 7C, according to various embodiments.

FIG. 8B illustrates a zoomed-in portion of the exemplar image 706 of FIG. 7C, according to various embodiments. As shown, in the image 706, a crack 724 includes fewer artifacts resulting from self-intersections than the crack 722 in the image 704.

Figure 9:
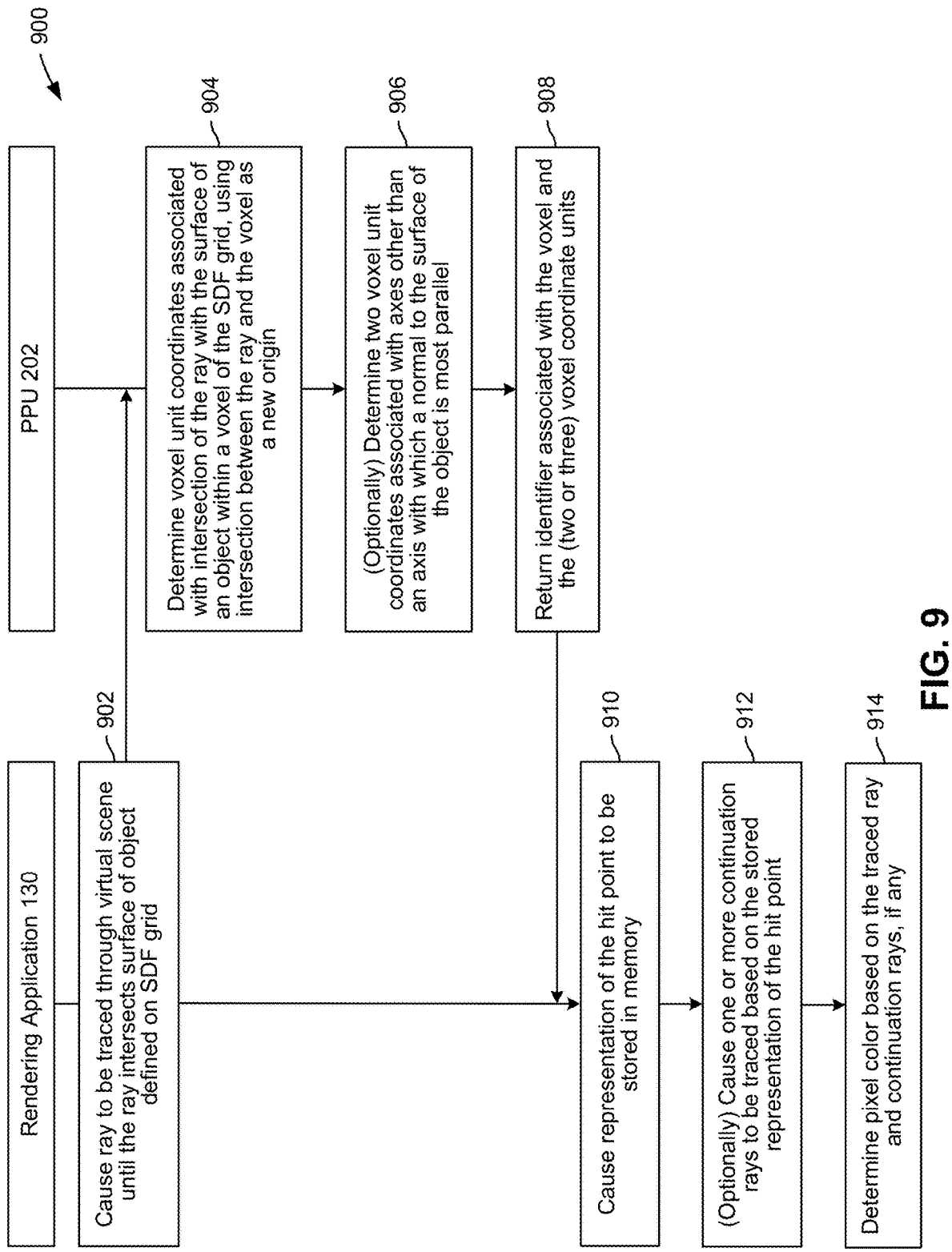
FIG. 9 is a flow diagram of method steps for determining a pixel color, according to various embodiments.

FIG. 9 is a flow diagram of method steps for determining a pixel color, according to various embodiments. Although the method steps are described in conjunction with the systems of FIGS. 1-4, persons skilled in the art will understand that any system configured to perform the method steps in any order falls within the scope of the present embodiments. Although described with respect to determining a single pixel color, in some embodiments, the method steps can be repeated to determine the colors of multiple pixels when rendering an image, such as a frame of a video or a standalone image.

As shown, a method 900 begins at step 902, where the rendering application 130 causes a ray to be traced through a virtual scene until the ray intersects the surface of an object defined on an SDF grid. In some embodiments, the SDF grid can be created in any technically feasible manner, including using well-known techniques, either at runtime or beforehand.

At step 904, the PPU 202 determines voxel unit coordinates associated with an intersection of the ray with the surface of an object within a voxel of the SDF grid, using the intersection between the ray and the voxel as a new origin. In some embodiments, a PPU 202 can determine the intersection between the ray and the voxel in any technically feasible manner, such as via a SVS, GTS, SBS, or SVO technique, as described above in conjunction with FIG. 5. When the intersection between the ray and the voxel is used as a new origin, the new origin can be transformed to the canonical space $[0,1]^3$ of a local coordinate frame associated with the voxel. Then, the intersection between the ray and the surface of an object can be computed as voxel unit coordinates (x, y, z) where the function $f(x, y, z)$ of equation (1) equals 0 and x, y, $z \in [0,1]^3$ in the canonical space, as described above in conjunction with FIG. 5.

At step 906, the PPU 202 optionally determines two of the voxel unit coordinates associated with axes other than an axis with which a normal to the surface of the object is most parallel. In some embodiments, the PPU 202 can compute the sum of absolute differences $d_x$, $d_y$, and $d_z$ of equation (6). In such cases, if $d_x$ is the largest of ($d_x$, $d_y$, $d_z$), then the PPU 202 can determine the two voxel unit coordinates as the y and z coordinates. If $d_y$ is the largest of ($d_y$, $d_y$, $d_z$), then the PPU 202 can determine the two voxel unit coordinates as the x and z coordinates. If $d_z$ is the largest of ($d_x$, $d_y$, $d_z$), then the PPU 202 can determine the two voxel unit coordinates as the x and y coordinates, as described above in conjunction with FIG. 6B.

At step 908, the PPU 202 returns an identifier associated with the voxel and the (two or three) voxel coordinate units. For example, in some embodiments, the identifier can be a location code.

At step 910, the rendering application 130 causes a representation of the hit point to be stored in memory, such as the PP memory 204 of the parallel processing subsystem 112 and/or elsewhere. In some embodiments, the representation of the hit point can include the identifier of the voxel and the (two or three) voxel unit coordinates returned by the PPU 202.

At step 912, the rendering application 130 optionally causes one or more continuation rays to be traced based on the stored representation of the hit point. Each continuation ray can be, e.g., a shadow ray, a reflection ray, or a refraction ray. Method steps for tracing a continuation ray when the stored representation includes a voxel identifier and three voxel unit coordinates are discussed in greater detail below in conjunction with FIG. 10. Method steps for tracing a continuation ray when the stored representation includes a voxel identifier and two voxel unit coordinates are discussed in greater detail below in conjunction with FIG. 11.

At step 914, the rendering application 130 determines a pixel color based on the ray that is traced at step 902 and the continuation rays that are traced at step 912, if any. In some embodiments, any technically feasible rendering operations can be performed to determine the pixel color using the traced rays, such as one or more well-known texture sampling operations, texture filtering operations, shading operations, etc.

Figure 10:
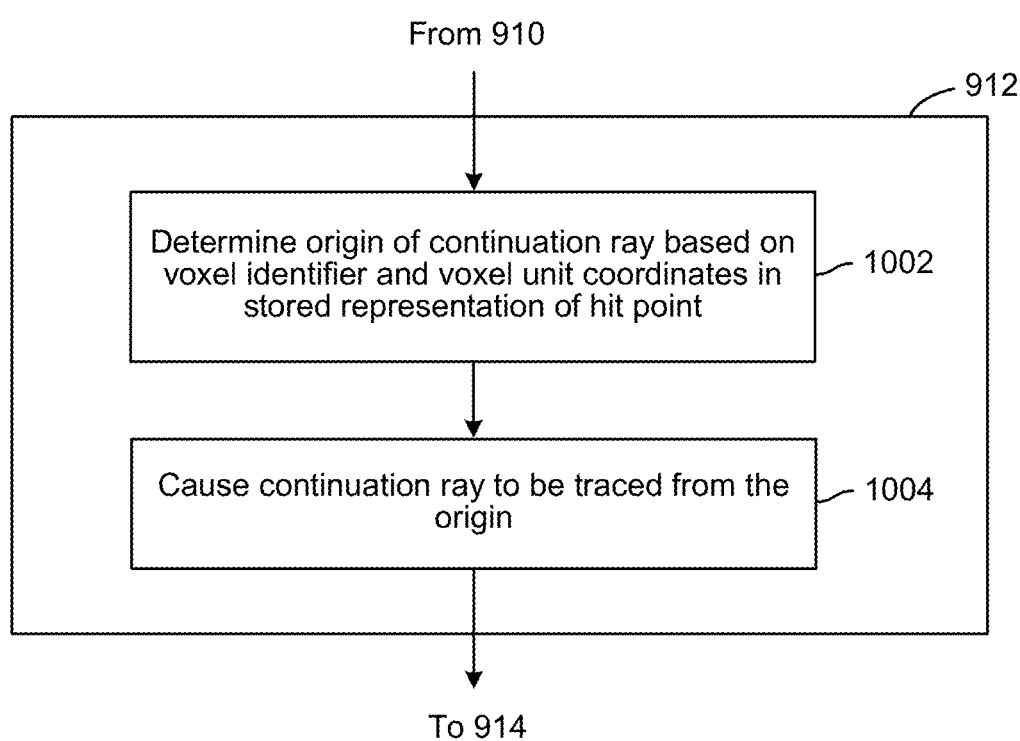
FIG. 10 is a flow diagram of method steps for tracing a continuation ray, according to various embodiments.

FIG. 10 is a flow diagram of method steps for tracing a continuation ray at step 912 of FIG. 9, according to various embodiments. Although the method steps are described in conjunction with the systems of FIGS. 1-4, persons skilled in the art will understand that any system configured to perform the method steps in any order falls within the scope of the present embodiments. Although described with respect to tracing a single continuation ray, in some embodiments, the method steps can be repeated to trace multiple continuation rays when rendering an image.

As shown, at step 1002, the rendering application 130 determines an origin of the continuation ray based on the voxel identifier and the voxel unit coordinates in the stored representation of the hit point. In some embodiments, the origin of the continuation ray can be determined by (1) transforming the voxel unit coordinates to a global coordinate frame, and (2) adding the transformed voxel unit coordinates to coordinates associated with a corner of the voxel in the global coordinate frame.

At step 1004, the rendering application 130 causes the continuation ray to be traced from the origin. In some embodiments, the continuation ray can be traced in any suitable direction, such as towards a light source in the case of a shadow ray or in a reflected or refracted direction in the cases of reflection and refraction rays, respectively. Although described with respect to tracing a single continuation ray at step 1004, in some embodiments multiple continuation rays can be traced from the origin determined at step 1002. For example, multiple shadow rays can be traced towards different light sources from the origin.

Figure 11:
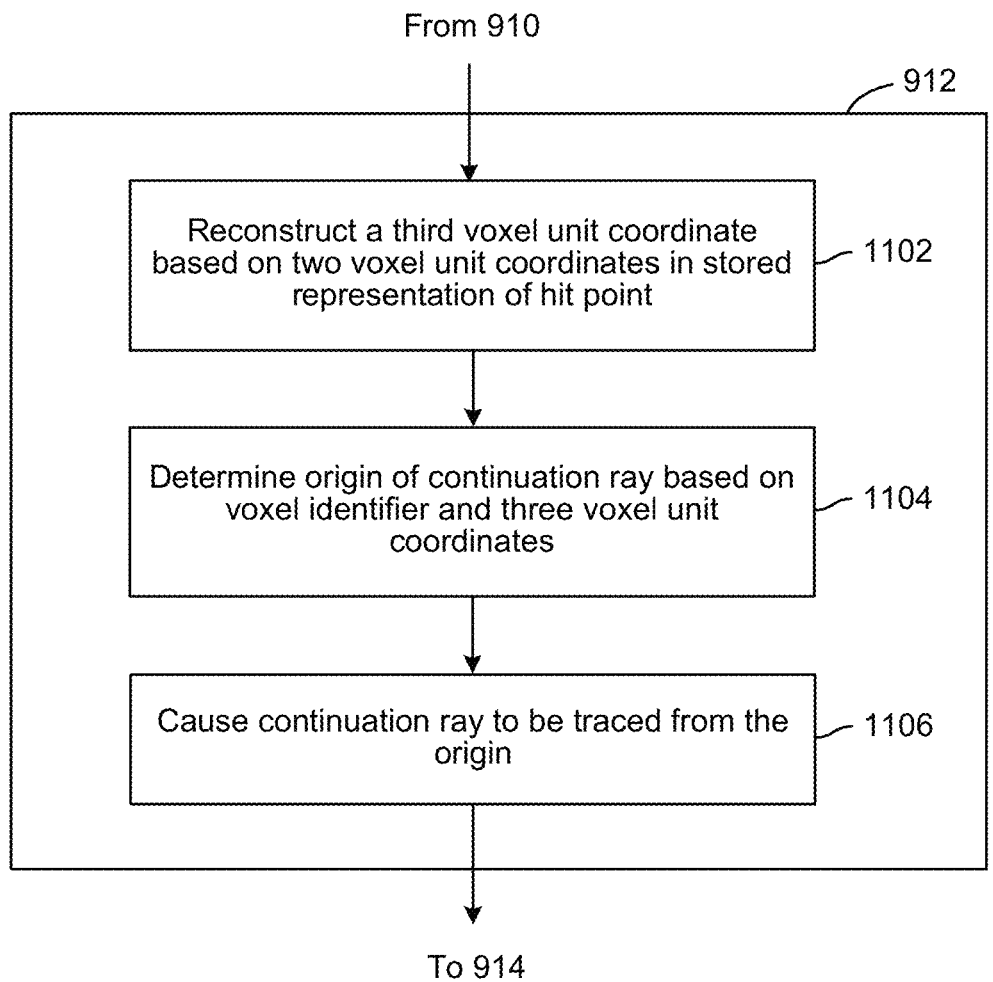
FIG. 11 is a flow diagram of method steps for tracing a continuation ray, according to various other embodiments.

FIG. 11 is a flow diagram of method steps for tracing a continuation ray at step 912 of FIG. 9, according to various other embodiments. Although the method steps are described in conjunction with the systems of FIGS. 1-4, persons skilled in the art will understand that any system configured to perform the method steps in any order falls within the scope of the present embodiments. Although described with respect to tracing a single continuation ray, in some embodiments, the method steps can be repeated to trace multiple continuation rays when rendering an image.

As shown, at step 1102, the rendering application 130 reconstructs a third voxel unit coordinate based on two voxel unit coordinates in the stored representation of a hit point. In some embodiments, if the y and z coordinates are stored, then the x coordinate can be reconstructed from the stored y and z coordinates using equation (4); if the x and z coordinates are stored, then the y coordinate can be reconstructed from the stored x and z coordinates using equation (5); and if the x and y coordinates are stored, then the z coordinate can be reconstructed from the stored x and y coordinates using equation (2), as described above in conjunction with FIG. 6B.

At step 1104, the rendering application 130 determines an origin of the continuation ray based on the voxel identifier and the three voxel unit coordinates. Step 1104 is similar to step 1002, described above in conjunction with FIG. 10.

At step 1106, the rendering application 130 causes the continuation ray to be traced from the origin. Step 1106 is similar to step 1004, described above in conjunction with FIG. 10. Although described with respect to tracing a single continuation ray at step 1106, in some embodiments multiple continuation rays (e.g., multiple shadow rays towards different light sources) can be traced from the origin determined at step 1104.

In sum, improved techniques are disclosed rendering SDFs. When a ray is traced into a graphics scene that includes one or more surfaces of geometry defined by an SDF, a hit point at which the ray intersects a surface is stored in a compact representation. In some embodiments, the compact representation includes an identifier associated with a voxel of an SDF grid in which the hit point lies, as well as x, y, and z coordinates of the hit point in a canonical space of a local coordinate frame associated with the voxel. In some other embodiments, the compact representation can include an identifier of the voxel and two coordinates of the hit point in the canonical space that are associated with axes that the normal to a surface of geometry within the voxel is not most parallel with. One or more continuation rays, such as shadow rays, reflection rays, and/or refraction rays, can be traced from the stored hit point. When the hit point is stored in the compact representation that includes two coordinates, a third coordinate can be computed from the two coordinates with greater accuracy than if the third coordinate had been stored.

At least one technical advantage of the disclosed techniques relative to the prior art is that the disclosed techniques store hit points in formats that help to avoid self-intersections and incorrectly traced shadow rays when rendering SDFs. Consequently, images rendered using the disclosed techniques can include fewer artifacts than are found in images rendered using conventional techniques, which increases overall image quality relative to what can be achieved with conventional techniques. In addition, the disclosed techniques permit hit points to be stored in formats that require less memory than conventional formats. These technical advantages represent one or more technological improvements over prior art approaches.

1. In some embodiments, a computer-implemented method for rendering one or more graphics images comprises tracing one or more rays through a graphics scene, storing one or more hit points based on one or more coordinate frames associated with one or more voxels of a grid, wherein the one or more rays intersect one or more surfaces of geometry in the one or more voxels, and rendering one or more graphics images based on the one or more hit points.

2. The computer-implemented method of clause 1, wherein each hit point is stored in a representation that includes an identifier associated with a voxel in which a ray intersects a surface of geometry at the hit point, and either one or two coordinate values associated with a location of the hit point within the voxel.

3. The computer-implemented method of clauses 1 or 2, wherein rendering the one or more graphics images comprises computing an additional coordinate value based on the one or two coordinate values, and tracing one or more additional rays through the graphics scene based on the one or two coordinate values and the additional coordinate value.

4. The computer-implemented method of any of clauses 1-3, wherein each hit point is stored in a representation that includes an identifier associated with a voxel in which a ray intersects a surface of geometry at the hit point, and three coordinate values associated with a location of the hit point within the voxel.

5. The computer-implemented method of any of clauses 1-4, wherein the one or more graphics images are associated with a video game, a film, or an architectural or design application.

6. In some embodiments, a computer-implemented method for performing ray tracing operations comprises tracing a ray through a graphics scene to a hit point at which the ray intersects a surface of geometry within a voxel of a grid, wherein a signed distance function is defined on the grid, and storing a representation of the hit point, wherein the representation includes either one or two coordinate values associated with a coordinate frame that corresponds to the voxel.

7. The computer-implemented method of clause 6, further comprising determining the one or two coordinate values based on an axis of the coordinate frame with which a normal to the surface is most parallel.

8. The computer-implemented method of clauses 6 or 7, further comprising determining the one or two coordinate values based on a plurality of sums of absolute differences between values of the signed distance function along different axes of the coordinate frame.

9. The computer-implemented method of any of clauses 6-8, further comprising computing an additional coordinate value based on the one or two coordinate values, and tracing one or more additional rays through the graphics scene based on the one or two coordinate values and the additional coordinate value.

10. The computer-implemented method of any of clauses 6-9, wherein the representation of the hit point further includes an identifier associated with the voxel.

11. The computer-implemented method of any of clauses 6-10, wherein the representation of the hit point further includes an additional coordinate value in the coordinate frame.

12. The computer-implemented method of any of clauses 6-11, wherein the coordinate frame comprises a canonical coordinate frame.

13. The computer-implemented method of any of clauses 6-12, further comprising tracing one or more additional rays through the graphics scene based on the representation of the hit point, and computing a pixel color based on the ray and the one or more additional rays.

14. In some embodiments, one or more non-transitory computer-readable media store program instructions that, when executed by at least one processor, cause the at least one processor to perform the steps of tracing a ray through a graphics scene to a hit point at which the ray intersects a surface of geometry within a voxel of a grid, wherein a signed distance function is defined on the grid, and storing a representation of the hit point that includes either one or two coordinate values in a coordinate frame associated with the voxel.

15. The one or more non-transitory computer-readable media of clause 14, wherein the instructions, when executed by the at least one processor, further cause the at least one processor to perform the step of determining the one or two coordinate values based on an axis of the coordinate frame with which a normal to the surface is most parallel.

16. The one or more non-transitory computer-readable media of clauses 14 or 15, wherein the instructions, when executed by the at least one processor, further cause the at least one processor to perform the step of determining the one or two coordinate values based on a plurality of sums of absolute differences between values of the signed distance function along different axes of the coordinate frame.

17. The one or more non-transitory computer-readable media of any of clauses 14-16, wherein the instructions, when executed by the at least one processor, further cause the at least one processor to perform the steps of computing an additional coordinate value based on the one or two coordinate values, and tracing one or more additional rays through the graphics scene based on the one or two coordinate values and the additional coordinate value.

18. The one or more non-transitory computer-readable media of any of clauses 14-17, wherein the instructions, when executed by the at least one processor, further cause the at least one processor to perform the steps of determining an intersection of the ray with the voxel, wherein the representation of the hit point further comprises an identifier associated with the voxel.

19. The one or more non-transitory computer-readable media of any of clauses 14-18, wherein the representation of the hit point further comprises an additional coordinate value in the coordinate frame.

20. The one or more non-transitory computer-readable media of any of clauses 14-19, wherein the one or two coordinate values are stored as sixteen bit floating point numbers.

21. In some embodiments, a system comprises one or more memories storing instructions, and one or more processors that are coupled to the one or more memories and, when executing the instructions, are configured to trace a ray through a graphics scene to a hit point at which the ray intersects a surface of geometry within a voxel of a grid, wherein a signed distance function is defined on the grid, and store a representation of the hit point that includes either one or two coordinate values in a coordinate frame associated with the voxel.

22. The system of clause 21, wherein, when executing the instructions, the one or more processors are further configured to determine the one or two coordinate values based on an axis of the coordinate frame with which a normal to the surface is most parallel.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for rendering one or more graphics images, the method comprising:
   tracing one or more rays through a graphics scene;
   storing one or more hit points based on one or more local coordinate frames located within one or more voxels of a grid, wherein the one or more rays intersect one or more surfaces of geometry in the one or more voxels; and
   rendering one or more graphics images based on the one or more hit points.

2. The computer-implemented method of claim 1, wherein each hit point is stored in a representation that includes:
   an identifier associated with a voxel in which a ray intersects a surface of geometry at the hit point; and
   at least one or two coordinate values in a local coordinate frame located within the voxel associated with a location of the hit point within the voxel.

3. The computer-implemented method of claim 2, wherein rendering the one or more graphics images comprises:
   computing an additional coordinate value based on the at least one or two coordinate values; and tracing one or more additional rays through the graphics scene based on the at least one or two coordinate values and the additional coordinate value.

4. The computer-implemented method of claim 1, wherein each hit point is stored in a representation that includes:
an identifier associated with a voxel in which a ray intersects a surface of geometry at the hit point; and
three coordinate values in a local coordinate frame located within the voxel associated with a location of the hit point within the voxel.

5. The computer-implemented method of claim 1, wherein the one or more graphics images are associated with a video game, a film, or an architectural or design application.

6. A computer-implemented method for performing ray tracing operations, the method comprising:
tracing a ray through a graphics scene to a hit point at which the ray intersects a surface of geometry within a voxel of a grid, wherein a signed distance function is defined on the grid; and
storing a representation of the hit point, wherein the representation includes at least one or two coordinate values associated with a local coordinate frame located within the voxel.

7. The computer-implemented method of claim 6, further comprising determining the at least one or two coordinate values based on an axis of the local coordinate frame with which a normal to the surface is most parallel.

8. The computer-implemented method of claim 6, further comprising determining the at least one or two coordinate values based on a plurality of sums of absolute differences between values of the signed distance function along different axes of the local coordinate frame.

9. The computer-implemented method of claim 6, further comprising:
computing an additional coordinate value based on the at least one or two coordinate values; and
tracing one or more additional rays through the graphics scene based on the at least one or two coordinate values and the additional coordinate value.

10. The computer-implemented method of claim 6, wherein the representation of the hit point further includes an identifier associated with the voxel.

11. The computer-implemented method of claim 6, wherein the representation of the hit point further includes an additional coordinate value in the local coordinate frame.

12. The computer-implemented method of claim 6, wherein the local coordinate frame comprises a canonical coordinate frame.

13. The computer-implemented method of claim 6, further comprising:
tracing one or more additional rays through the graphics scene based on the representation of the hit point; and
computing a pixel color based on the ray and the one or more additional rays.

14. One or more non-transitory computer-readable media storing program instructions that, when executed by at least one processor, cause the at least one processor to perform the steps of:
tracing a ray through a graphics scene to a hit point at which the ray intersects a surface of geometry within a voxel of a grid, wherein a signed distance function is defined on the grid; and storing a representation of the hit point that includes at least one or two coordinate values in a local coordinate frame located within the voxel.

15. The one or more non-transitory computer-readable media of claim 14, wherein the instructions, when executed by the at least one processor, further cause the at least one processor to perform the step of:
determining the at least one or two coordinate values based on an axis of the local coordinate frame with which a normal to the surface is most parallel.

16. The one or more non-transitory computer-readable media of claim 14, wherein the instructions, when executed by the at least one processor, further cause the at least one processor to perform the step of:
determining the at least one or two coordinate values based on a plurality of sums of absolute differences between values of the signed distance function along different axes of the local coordinate frame.

17. The one or more non-transitory computer-readable media of claim 14, wherein the instructions, when executed by the at least one processor, further cause the at least one processor to perform the steps of:
computing an additional coordinate value based on the at least one or two coordinate values; and
tracing one or more additional rays through the graphics scene based on the at least one or two coordinate values and the additional coordinate value.

18. The one or more non-transitory computer-readable media of claim 14, wherein the instructions, when executed by the at least one processor, further cause the at least one processor to perform the steps of:
determining an intersection of the ray with the voxel, wherein the representation of the hit point further comprises an identifier associated with the voxel.

19. The one or more non-transitory computer-readable media of claim 14, wherein the representation of the hit point further comprises an additional coordinate value in the local coordinate frame.

20. The one or more non-transitory computer-readable media of claim 14, wherein the one or two coordinate values are stored as sixteen bit floating point numbers.

21. A system, comprising:
one or more memories storing instructions; and
one or more processors that are coupled to the one or more memories and, when executing the instructions, are configured to:
trace a ray through a graphics scene to a hit point at which the ray intersects a surface of geometry within a voxel of a grid, wherein a signed distance function is defined on the grid, and
store a representation of the hit point that includes at least one or two coordinate values in a local coordinate frame located within the voxel.

22. The system of claim 21, wherein, when executing the instructions, the one or more processors are further configured to:
determine the at least one or two coordinate values based on an axis of the local coordinate frame with which a normal to the surface is most parallel.

\* \* \* \* \*